United States Patent
Flaherty et al.

(10) Patent No.: US 11,184,384 B2
(45) Date of Patent: Nov. 23, 2021

(54) INFORMATION TECHNOLOGY SECURITY ASSESSMENT MODEL FOR PROCESS FLOWS AND ASSOCIATED AUTOMATED REMEDIATION

(71) Applicant: BANK OF AMERICA CORPORATION, Charlotte, NC (US)

(72) Inventors: Casey L. Flaherty, Chicago, IL (US); Michael Sbandi, Charlotte, NC (US); Jo-Ann Taylor, Godalming (GB); Michael Robert Young, Davidson, NC (US); Zarna Arun Patel, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 285 days.

(21) Appl. No.: 16/440,289

(22) Filed: Jun. 13, 2019

(65) Prior Publication Data
US 2020/0396240 A1   Dec. 17, 2020

(51) Int. Cl.
*H04L 29/06* (2006.01)
*G06N 20/20* (2019.01)

(52) U.S. Cl.
CPC ......... *H04L 63/1433* (2013.01); *G06N 20/20* (2019.01); *H04L 63/1441* (2013.01); *H04L 63/20* (2013.01)

(58) Field of Classification Search
CPC . H04L 63/1433; H04L 63/20; H04L 63/1441; G06N 20/20; G06N 5/003; G06N 5/02
See application file for complete search history.

(56) References Cited

U.S. PATENT DOCUMENTS

| | | | |
|---|---|---|---|
| 7,930,256 | B2 | 4/2011 | Gonsalves et al. |
| 8,042,171 | B1* | 10/2011 | Nordstrom .......... H04L 63/0263 726/13 |
| 8,150,783 | B2 | 4/2012 | Gonsalves et al. |
| 8,266,701 | B2 | 9/2012 | McConnell et al. |
| 8,844,041 | B1 | 9/2014 | Kienzle et al. |
| 8,984,644 | B2 | 3/2015 | Oliphant et al. |
| 9,100,430 | B1 | 8/2015 | Seiver et al. |
| 9,426,169 | B2 | 8/2016 | Zandani |
| 9,467,455 | B2 | 10/2016 | Seiver et al. |
| 9,521,160 | B2 | 12/2016 | Ng et al. |
| 9,537,884 | B1 | 1/2017 | Raugas et al. |
| 2008/0167920 | A1* | 7/2008 | Schmidt ................. G06Q 90/00 705/7.36 |
| 2010/0153156 | A1 | 6/2010 | Guinta et al. |
| 2014/0137257 | A1* | 5/2014 | Martinez ............. H04L 63/1433 726/25 |
| 2016/0044057 | A1 | 2/2016 | Chenette et al. |

(Continued)

*Primary Examiner* — Meng Li
(74) *Attorney, Agent, or Firm* — Michael A. Springs; Moore & Van Allen PLLC; James C. Edwards

(57) ABSTRACT

Information technology/cyber security for computer-related processes in which vulnerabilities are identified and, those vulnerabilities which are technology-related are automatically remediated by determining and executing network-based tasks. The most granular level of computer-related process assessment in made possible by reliance on a critical function/process taxonomy this is automatically generated and, as such, the present invention, identifies both technology and non-technology-related vulnerabilities.

16 Claims, 7 Drawing Sheets

(56) References Cited

U.S. PATENT DOCUMENTS

2016/0234240 A1* 8/2016 Dietrich .............. H04L 63/1433
2018/0146004 A1* 5/2018 Belfiore, Jr. .......... G06F 21/577
2018/0324207 A1* 11/2018 Reybok, Jr. ......... H04L 63/1416

* cited by examiner

INFORMATION TECHNOLOGY SECURITY ASSESSMENT MODEL FOR PROCESS FLOWS AND ASSOCIATED AUTOMATED REMEDIATION

FIELD OF THE INVENTION

The present invention is generally directed to information technology security and, more specifically, providing tan information technology security assessment model for computer-related processes and associated automated remediation of the vulnerabilities resulting from the assessment model.

BACKGROUND

Information technology security, otherwise referred to as cyber security is an increasing concern due to the rapid pace at which malicious cyber activity occurs. In many instances successful infiltration of a computing network is due to human or process vulnerabilities rather than technology-related weaknesses. However, assessments performed to date have been primarily technology focused, which creates a gap when evaluating the susceptibility of an entity to cyber-attacks.

Therefore, a need exits to develop systems and the like for evaluate the sufficiency of information technology security as it applies to a computer-related process and, specifically, the sub-processes, workflow, operators and technology controls associated with the computer-related process. Such a system should be robust in design such that it provides the capability to evaluate all aspects of an end-to-end process and identify where vulnerabilities exist in the process and the impact that the vulnerabilities present. In addition, in those instances in which the vulnerabilities are technology-related, a need exists to determine a course of remediation and to automatically implement the remediation so as to lessen or eliminate the vulnerabilities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for evaluating the information technology/cyber security of a computer-related process. Specifically, the assessment/evaluation model of the present information focusses on the sub-processes, workflow, technology controls and implementers/operators associated with the process to identify vulnerabilities. In some embodiments of the invention, in which the vulnerabilities are technology-related, automated remediation is performed within the related computing network to lessen or eliminate the vulnerabilities.

In specific embodiments of the invention critical computing-related processes associated with critical functions are identified and machine learning models and process-specific control frameworks are implemented to identify the controls associated with a process based on identified critical vulnerability assets. Subsequently, the identified controls serve as the basis for automated generation of a vulnerability assessment that is specific to the computer-related process.

Threat modeling algorithms are implemented to define the vulnerabilities for the selected computer-related process. In specific embodiments of the invention, machine learning models are implemented to map the identified controls to attack patterns and the attack patterns are applied to the critical vulnerability assets to define vulnerabilities associated with sub-processes, process flows, technology components and/or operators associated with the process.

In response to defining the vulnerabilities, and in some embodiments quantifying the vulnerabilities, automated network-based remediation of technology-related vulnerabilities occurs.

In specific embodiments of the invention, an automated taxonomy process is implemented to map identified critical computer-related processes to the most granular tier of data, i.e., the sub-processes, process flows, technology components and/or operators associated with the process. The taxonomy serves to build the inventory of data that is assessed/evaluated for security vulnerabilities. Moreover, in specific embodiments, machine learning is implemented to prioritize the process inventory data, which serves as the basis for determining areas of focus and determining assessment scheduling.

A system for defining security vulnerabilities of computer-related processes and implementing automated remediation defines first embodiments of the invention. The system includes a distributed computing network comprising a plurality of computing apparatus that are configured to communicate via the distributed computing network. The system further includes a computing platform comprising a memory and one or more processing devices in communication with the computing platform.

The system includes a vulnerability assessment plan generation module that is stored in the memory and executable by one or more of the processing devices. The module is configured to receive first data from a plurality of disparate data sources and identify, from the first data, critical vulnerability assets associated with a selected one of a plurality of computer-related processes. The module is further configured to implement one or more machine learning algorithms and a process-related control framework to identify a plurality of controls for a selected one of the computer-related processes based at least on the critical vulnerability assets and generate a vulnerability assessment specific to the selected computer-related process including the plurality of controls.

The system further includes a vulnerability assessment module that is stored in the memory and executable by one or more of the processing devices. The module is configured to implement one or more threat modeling algorithms to define vulnerabilities for the selected one of the computer-related processes.

In addition, the system includes a network remediation module that is stored in the memory and executable by one or more of the processing devices. The module is configured to determine one or more network tasks for optimizing the distributed computing network-based on the defined vulnerabilities, and, in response to determining the one or more network tasks, execute at least one of the tasks to optimize the distributed computing network.

In specific embodiments the system further includes a taxonomy module that is stored in the memory and executable by the one or more processing devices. The module is configured to identify a plurality of computer-related critical functions, receive second data from a plurality of second disparate data sources, and identify, from the second data, a plurality of computer-related critical services and a plurality computer-related processes. The module is further configured to map (i) the identified computer-related critical functions to the computer-related critical services, and (ii) the computer-related critical services to the computer-related processes and, in some embodiments, (iii) the computer-related processes to at least one of (a) one or more sub-processes associated with a computer-related process, (b) one or more entities responsible for a computer-related process, (c) one or more process flows for conducting a computer-related process, and (d) technology components required for a computer-related process.

In specific embodiments of the system, the vulnerability assessment module is further configured to implement one or more machine learning algorithms to map one or more of the plurality of controls to a plurality attack patterns. In such embodiments of the system, the vulnerability assessment module is further configured to apply the plurality of attack patterns to one or more of the critical vulnerability assets to define vulnerabilities associated (a) at least one of the one or more sub-processes associated with a computer-related process, (b) at least one of the one or more entities responsible for a computer-related process, (c) at least one of the one or more process flows for conducting a computer-related process, and (d) at least one of the technology components required for a computer-related process. In still further such embodiments of the system, the vulnerability assessment module is further configured to implement one or more machine learning algorithms to quantify one of more the defined and unmitigated vulnerabilities associated with the computer-related process.

In still further embodiments of the system, the network remediation module is further configured to determine the one or more network tasks including at least one of (i) re-routing network traffic from one or more first computing apparatus to one or more computing apparatus, (ii) opening and closing ports in one or more of the computing apparatus, and (iii) changing communication protocols for one or more network communications delivered via the distributed communication network. In other specific embodiments of the system, the network remediation module is further configured to monitor the execution of the one or more network tasks and generate and communicate one or more remediation reports that indicate a progress of the monitored one or more network tasks.

In other specific embodiments the system includes a computer-related function criticality-determining module that is stored in the memory and executable by one or more of the processing devices. The module is configured to implement one or more machine learning algorithms using logic defined by processing of the taxonomy module to determine a level of criticality associated with computer-related functions.

In still further specific embodiments the system includes a vulnerability assessment scheduling module that is stored in the memory and executable by one or more of the processing devices. The module is configured to implement one or more machine learning algorithms to determine prioritization for the plurality of computer-related processes based at least on mapping results of the taxonomy module, and schedule a plurality of vulnerability assessments for the computer-related processes based at least on the based on the prioritization.

In still further specific embodiments of the system, the vulnerability assessment plan generation module is further configured to implement one or more supervised logistic regression algorithms to assign the critical vulnerability assets to the selected computer-related processes, and implement one or more supervised decision tree algorithms to identify the plurality of controls for the selected one of the computer-related processes.

In yet further specific embodiments the system includes a vulnerability reporting module that is stored in the memory and executable by one or more of the processing devices. The module is configured to map the defined vulnerabilities to industry benchmarks, and generate and communicate a vulnerability assessment report that is based on the mapping of the defined vulnerabilities to the industry standards and indicates an estimated impact of the defined vulnerabilities.

A computer-implemented method for defining security vulnerabilities of computer-related processes and implementing automated remediation defines second embodiments of the invention. The method is executed by one or more computing device processors. The method includes receiving first data from a plurality of disparate data sources and identifying, from the first data, critical vulnerability assets associated with a selected one of a plurality of computer-related processes. The method further includes implementing one or more machine learning algorithms and a process-related control framework to identify a plurality of controls for a selected one of the computer-related processes based at least on the critical vulnerability assets and generating a vulnerability assessment specific to the selected computer-related process including the plurality of controls. In addition the method includes implementing one or more threat modeling algorithms to define vulnerabilities for the selected one of the computer-related processes. Further, the method includes determining one or more network tasks for optimizing a distributed computing network-based on the defined vulnerabilities, and, in response to determining the one or more network tasks, executing at least one of the tasks to optimize the distributed computing network.

In specific embodiments the method further includes identifying a plurality of computer-related critical functions, receiving second data from a plurality of second disparate data sources, and identifying, from the second data, a plurality of computer-related critical services and a plurality computer-related processes. In addition the method includes mapping (i) the identified computer-related critical functions to the computer-related critical services, (ii) the computer-related critical services to the computer-related processes and (iii) the computer-related processes to at least one of (a) one or more sub-processes associated with a computer-related process, (b) one or more entities responsible for a computer-related process, (c) one or more process flows for conducting a computer-related process, and (d) technology components required for a computer-related process.

Further, in specific embodiments the method further includes implementing one or more machine learning algorithms to map one or more of the plurality of controls to a plurality attack patterns; and applying the plurality of attack patterns to one or more of the critical vulnerability assets to define vulnerabilities associated (a) at least one of the one or more sub-processes associated with a computer-related process, (b) at least one of the one or more entities responsible for a computer-related process, (c) at least one of the one or more process flows for conducting a computer-related process, and (d) at least one of the technology components required for a computer-related process.

In yet further embodiments the method includes monitoring the execution of the one or more network tasks, and generating and communicating one or more remediation reports that indicate a progress of the monitored one or more network tasks.

A computer program product including a non-transitory computer-readable medium defines third embodiments of the invention. The non-transitory computer-readable medium includes a first set of codes for causing a computer to receive first data from a plurality of disparate data sources and a second set of codes for causing a computer to identify, from the first data, critical vulnerability assets associated with a selected one of a plurality of computer-related processes. The computer-readable medium additionally includes a third set of codes for causing a computer to implement one or more machine learning algorithms and a process-related control framework to identify a plurality of controls for a selected one of the computer-related processes based at least on the critical vulnerability assets and a fourth set of codes for causing a computer to generate a vulnerability assessment specific to the selected computer-related process including the plurality of controls. Further, the computer-readable medium includes a fifth set of codes for causing a computer to implement one or more threat modeling algorithms to define vulnerabilities for the selected one of the computer-related processes. Moreover, the computer-readable medium includes a sixth set of codes for causing a computer to determine one or more network tasks for optimizing a distributed computing network-based on the defined vulnerabilities; and a seventh set of codes for causing a computer to, in response to determining the one or more network tasks, executing at least one of the tasks to optimize the distributed computing network.

In further specific embodiments the computer-readable medium of the computer-program product includes an eighth set of codes for causing a computer to identify a plurality of computer-related critical functions, receive second data from a plurality of second disparate data sources, and identify, the second data, a plurality of computer-related critical services and a plurality computer-related processes/ In addition, the computer-readable medium of the computer program product includes a ninth set of codes for causing a computer to map (i) the identified computer-related critical functions to the computer-related critical services, (ii) the computer-related critical services to the computer-related processes and (iii) the computer-related processes to at least one of (a) one or more sub-processes associated with a computer-related process, (b) one or more entities responsible for a computer-related process, (c) one or more process flows for conducting a computer-related process, and (d) technology components required for a computer-related process.

In other specific embodiments of the computer program product, the computer-readable medium includes an eighth set codes for causing a computer to implement one or more machine learning algorithms to map one or more of the plurality of controls to a plurality attack patterns. The computer-readable medium additionally includes a ninth set of codes for causing a computer to apply the plurality of attack patterns to one or more of the critical vulnerability assets to define vulnerabilities associated (a) at least one of the one or more sub-processes associated with a computer-related process, (b) at least one of the one or more entities responsible for a computer-related process, (c) at least one of the one or more process flows for conducting a computer-related process, and (d) at least one of the technology components required for a computer-related process.

Thus, according to embodiments of the invention, which will be discussed in greater detail below, the present invention provides for information technology/cyber security assessments of computer-related processes to identify where vulnerabilities exist and, in some embodiments, the impact of the vulnerabilities. As a result of identifying the vulnerabilities, technology-related vulnerabilities are network-based remediation tasks are identified and automatically executed. In specific embodiments of the invention, the most granular level of process related data is identified through a taxonomy that is automatically generated for critical functions and their underlying critical processes. The taxonomy serves as the basis for building the inventory of process-related data that is assessed/evaluated for security vulnerabilities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
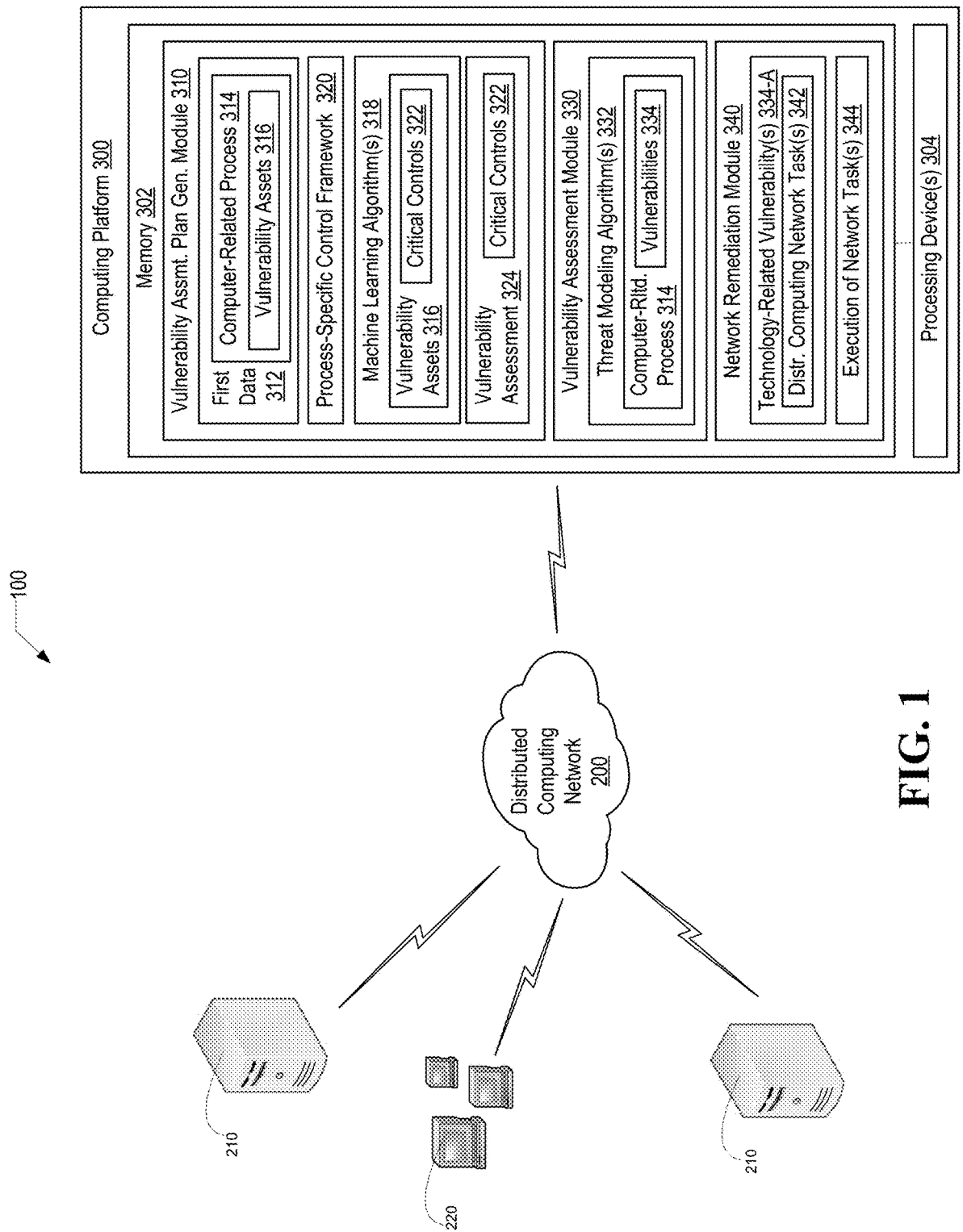
Figure 2:
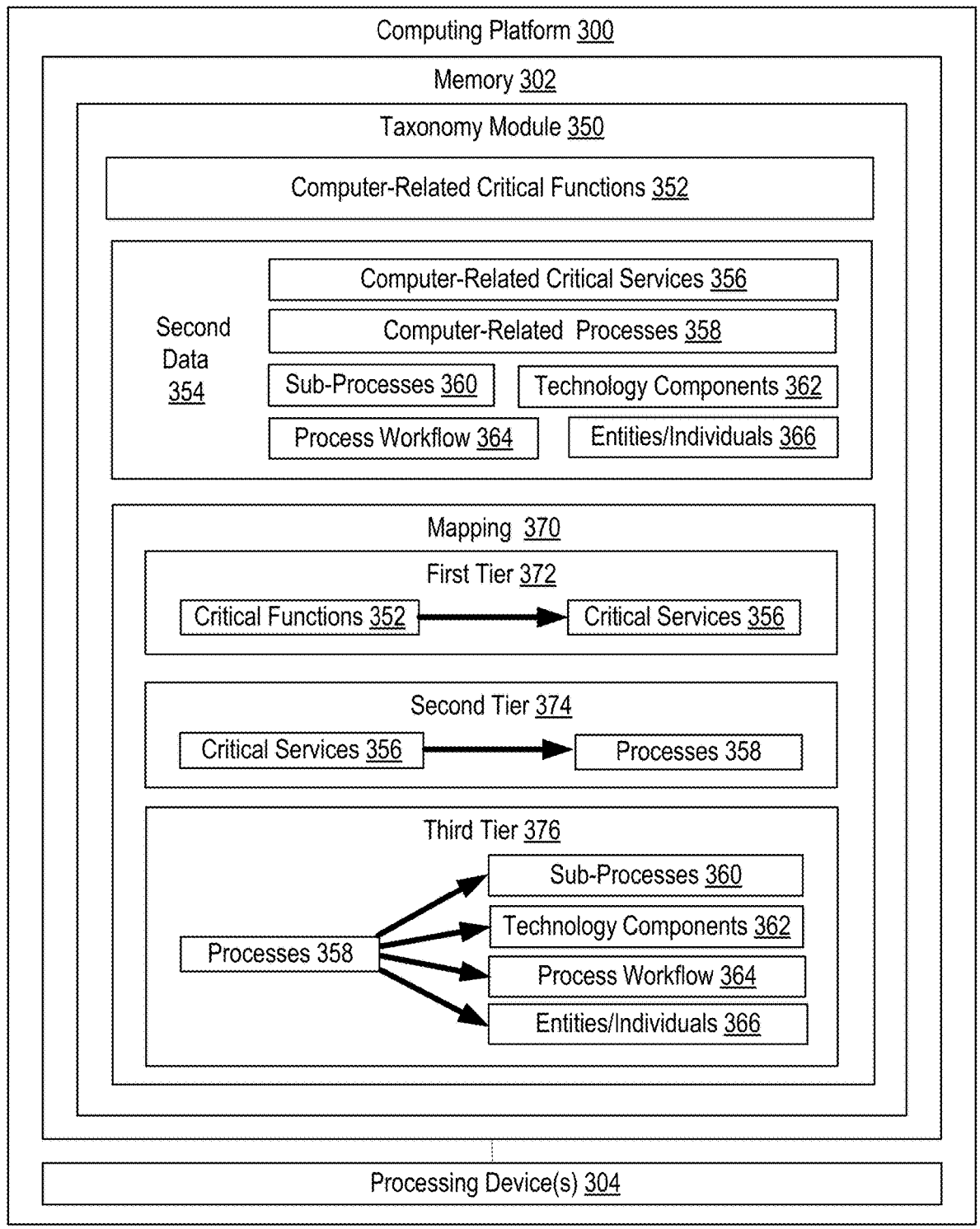
Figure 3:
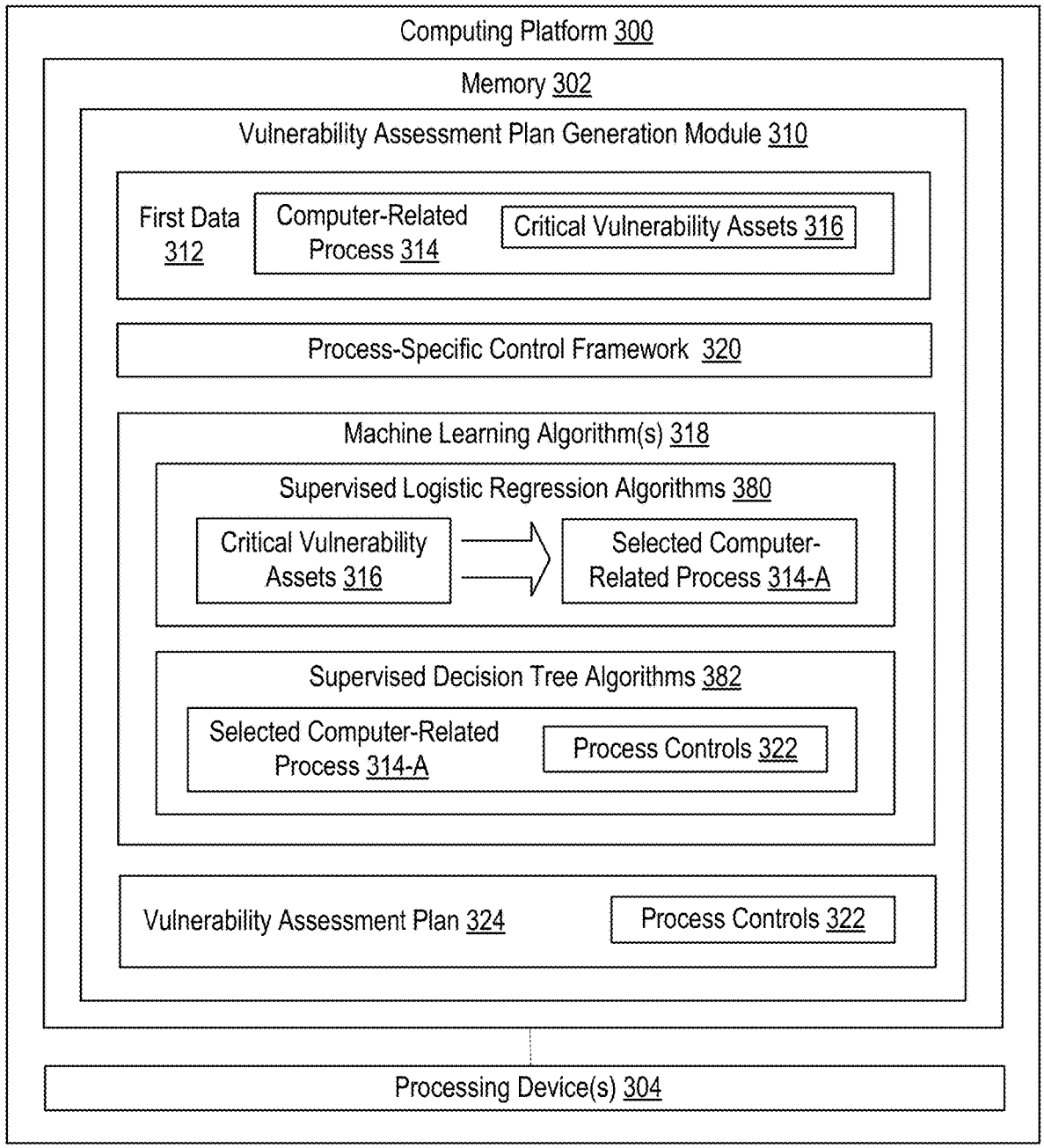
Figure 4:
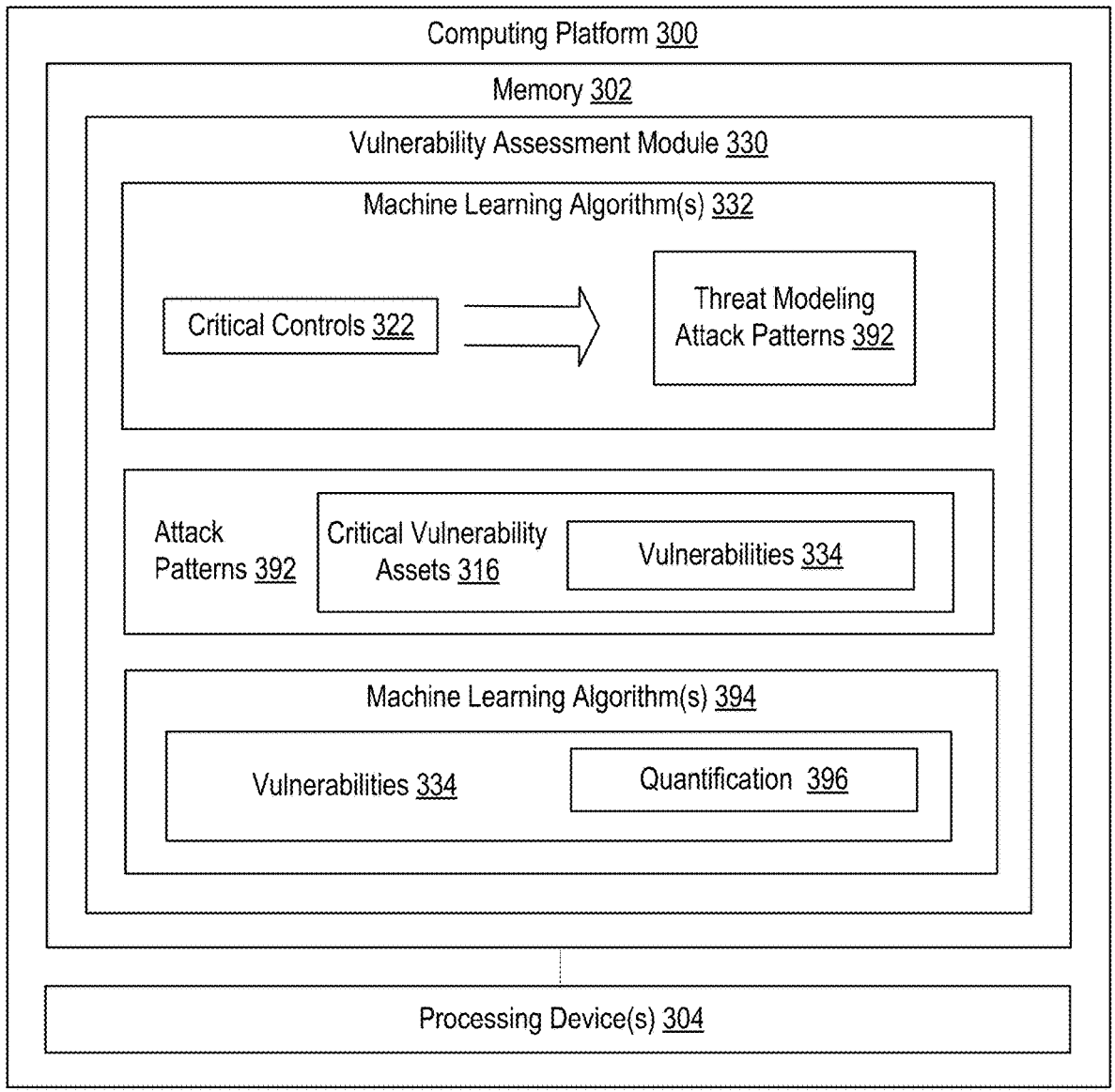
Figure 5:
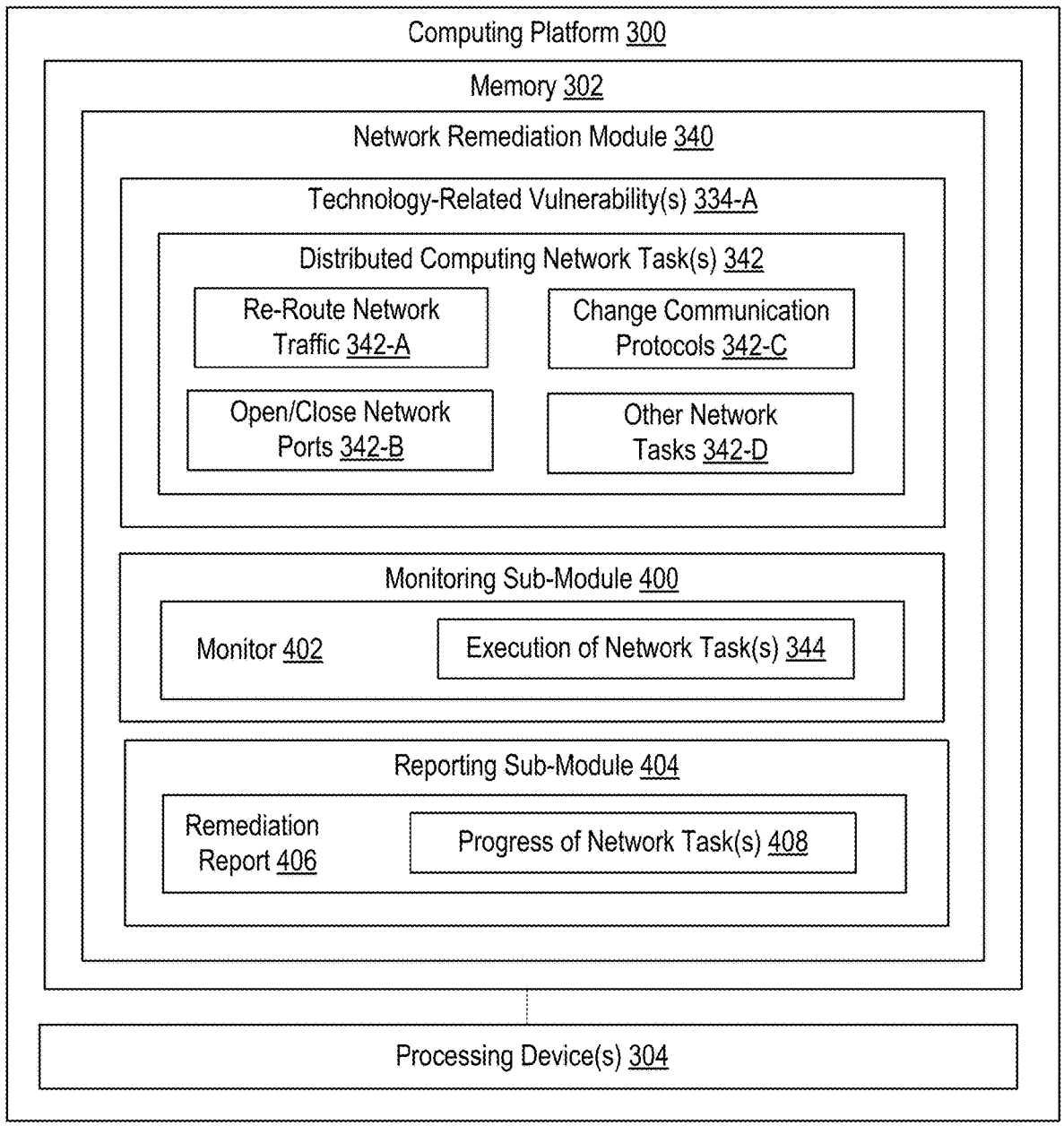
Figure 6:
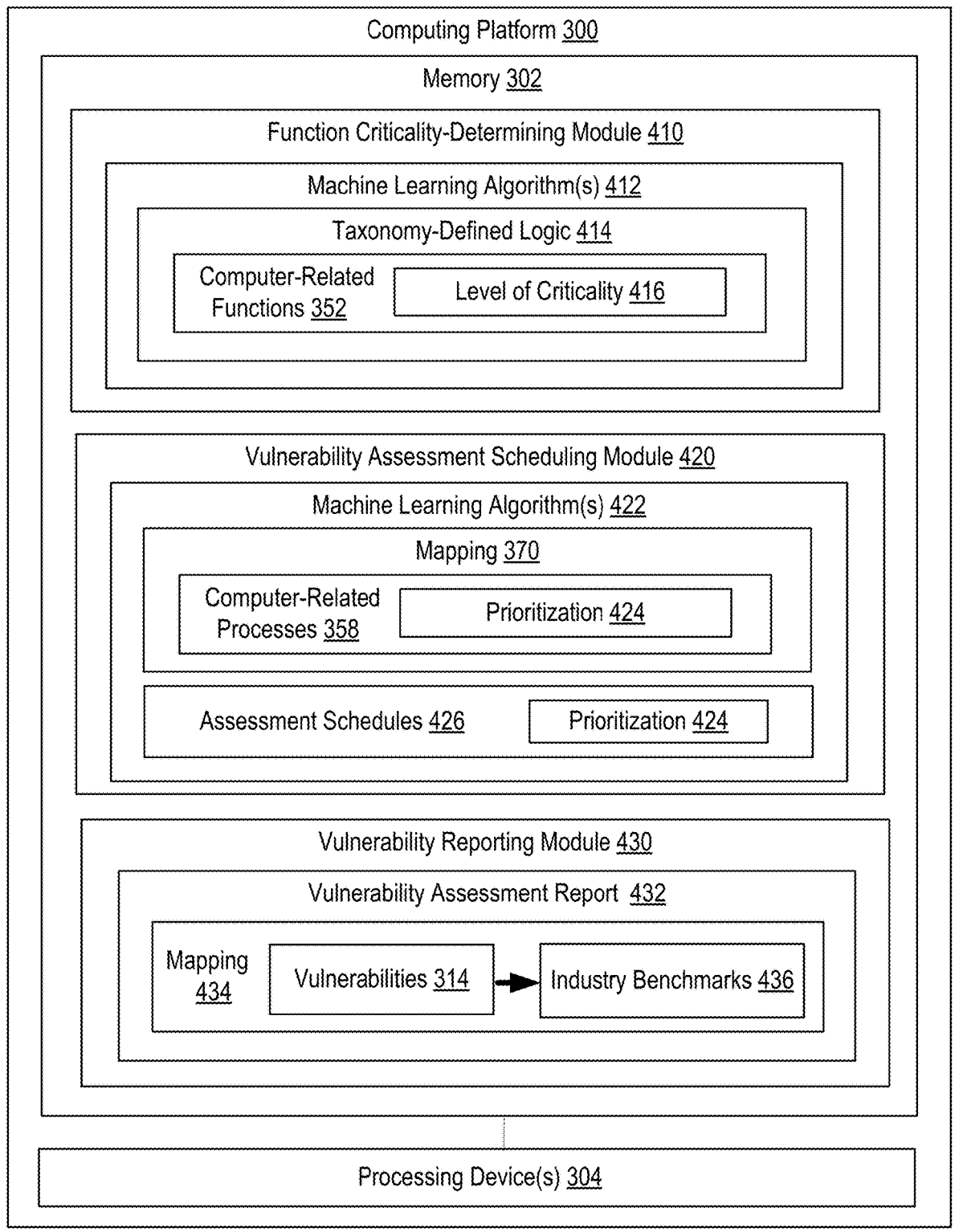
Figure 7:
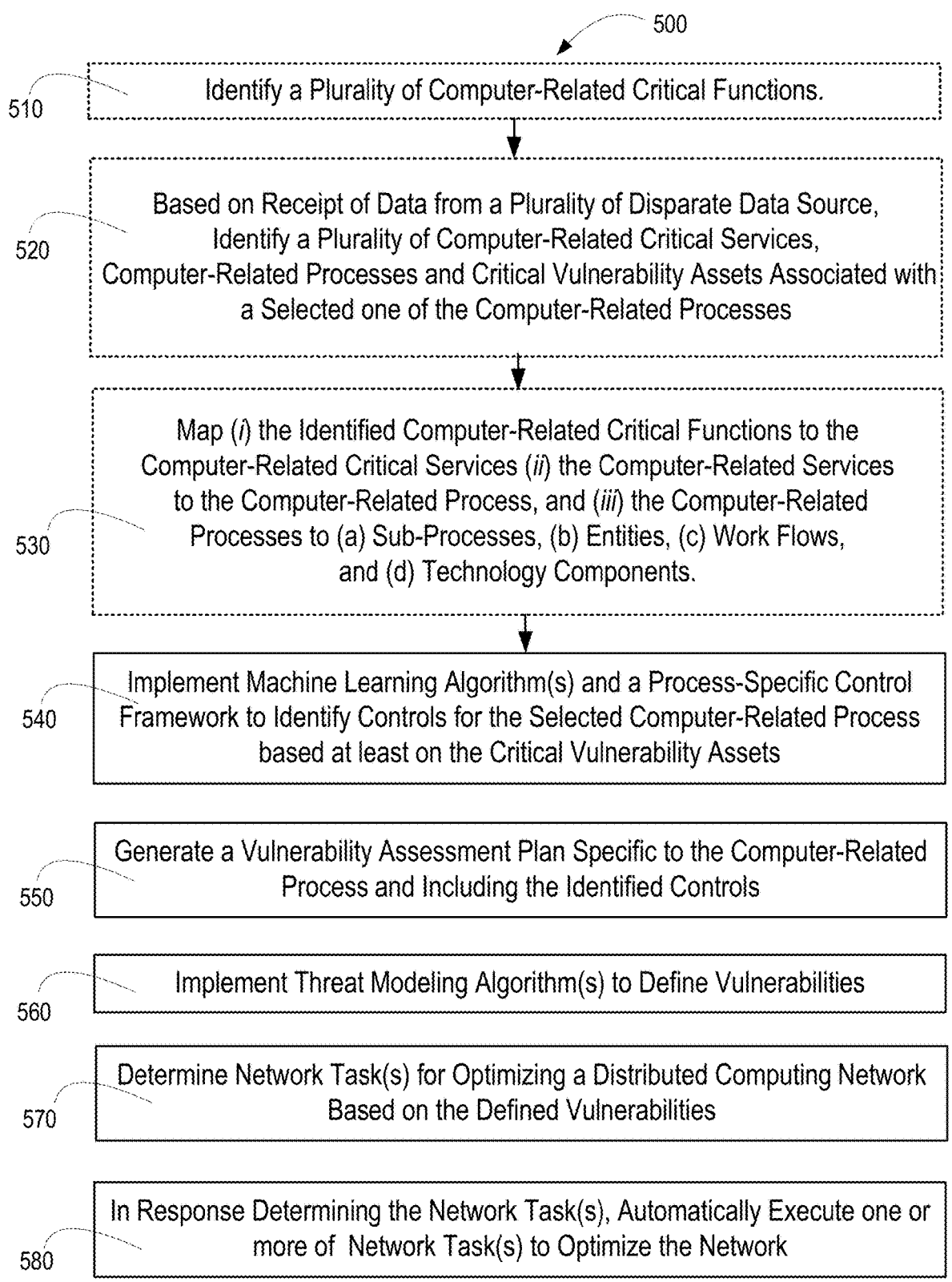

Having thus described embodiments of the disclosure in general terms, reference will now be made to the accompanying drawings, wherein:

FIG. 1 is a schematic diagram of a system for implementing an Information Technology (IT)/cyber security assessment model for computer-related processes and associated automated remediation, in accordance with some embodiments of the present disclosure;

FIG. 2 is a block diagram of a computing platform including a taxonomy module for mapping computing-related functions, services and processes, in accordance with some embodiments of the present disclosure;

FIG. 3 is a block diagram of an the computing platform including a vulnerability assessment plan generation module for generating a vulnerability assessment plan for computer-related processes, in accordance with some embodiments of the present disclosure;

FIG. 4 is a block diagram of the computing platform including a vulnerability assessment module configured to execute the vulnerability assessment plan and define vulnerabilities for business-related processes, in accordance with embodiments of the present invention;

FIG. 5 is a block diagram of the computing platform including a network remediation module configured to determine one or more network tasks for remedying the defined vulnerabilities and automatically executing the network tasks, in accordance with embodiments of the present invention;

FIG. 6 is a block diagram of the computing platform including a function-criticality-determining module, a vulnerability assessment scheduling module and a vulnerability reporting module, in accordance with embodiments of the present invention; and FIG. 7 is flow diagram of a method for Information Technology (IT)/cyber security assessment for a computer-related process and associated automated remediation, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for evaluating the information technology/cyber security of a computer-related process to identify technology-related and non-technology related vulnerabilities. Specifically, the assessment/evaluation model of the present information provides for focusing on the most granular level of the process, i.e., sub-processes, workflow, technology controls and entities/individuals associated with the process to identify vulnerabilities associated therewith. In some embodiments of the invention, in which the vulnerabilities are technology-related, automated remediation is performed within the related computing network to lessen or eliminate the vulnerabilities.

In specific embodiments of the invention, an automated taxonomy process is implemented to map identified critical computer-related processes to the most granular tier of data, i.e., the sub-processes, process flows, technology components and/or operators associated with the process. The taxonomy serves to build the inventory of data that is assessed/evaluated for security vulnerabilities. Moreover, in specific embodiments, machine learning is implemented to prioritize the process inventory data, which serves as the basis for determining areas of focus and determining assessment scheduling.

In further specific embodiments of the invention, critical computing-related processes associated with critical functions are identified and machine learning models and process-specific control frameworks are implemented to identify the controls associated with a process based on identified critical vulnerability assets. Subsequently, the identified controls serve as the basis for automated generation of a vulnerability assessment that is specific to the computer-related process.

Threat modeling algorithms are implemented to define the vulnerabilities for the selected computer-related process. Specifically, machine learning models/algorithms are implemented to map the identified controls to attack patterns, e.g., Common Attach Pattern Enumerated Classification (CAPEC) attack patterns or the like and the attack patterns are applied to the identified critical vulnerability assets associated with the computer-related process to define vulnerabilities associated with sub-processes, process flows, technology components and/or entities/individuals.

In response to defining the vulnerabilities, and in some embodiments quantifying the vulnerabilities, network-based remediation tasks may be determined for technology-related vulnerabilities and automatically executed/implemented. In addition, automated vulnerability reports may be generated and communicated which may map common vulnerability exposures and other similar industry benchmarks.

Turning now to the figures, FIG. 1 is a schematic diagram of an exemplary system 100 for Information Technology (IT)/cyber security assessment for computer-related processes and associated automated remediation, in accordance with embodiments of the present invention. The system 100 includes a distributed computing network 200, such as an intranet or the like that includes a plurality of computing apparatus, such as servers 210, workstations 220 and the like, which are configured to communicate and exchange data via the distributed computing network 200.

The system 100 additionally includes a computing platform 300 including a memory 302 and one or more processing devices 304 that are in communication with the memory 302. Computing platform 300, which comprise one or more computing devices (e.g., personal computers, servers or the like), is configured to execute instructions, such as algorithms, modules, routines, applications and the like. Memory 302 may comprise volatile and non-volatile memory, such as read-only and/or random-access memory (RAM and ROM), EPROM, EEPROM, flash cards, or any memory common to computing platforms). Moreover, memory 302 may comprise cloud storage, such as provided by a cloud storage service and/or a cloud connection service. Processing device 304 may be an application-specific integrated circuit ("ASIC"), or other chipset, logic circuit, or other data processing device. Processing device 304 may execute one or more application programming interface (APIs) (not shown in the Figures) that interfaces with any resident programs, such as modules 310, 330, 340 or the like, stored in the memory 302 of the computing platform 300 and any external programs. Additionally, processing device 304 may include various processing subsystems (not shown in the Figures) embodied in hardware, firmware, software, and combinations thereof, that enable the functionality of computing platform 300 and the operability of the computing platform 300 on the distributed computing network 200. For example, processing subsystems allow for initiating and maintaining communications and exchanging data with other networked devices, such as servers 210 and workstations 220. For the disclosed aspects, processing subsystems of processing device 304 may include any subsystem used in conjunction with modules 310, 330 and 340 and related tools, routines, sub-routines, algorithms, sub-algorithms, sub-modules thereof.

Computing platform 300 may additionally include a communications module (not shown in the figures) embodied in hardware, firmware, software, and combinations thereof, that enables electronic communications between the computing platform 300 and other network devices. Thus, communication module may include the requisite hardware, firmware, software and/or combinations thereof for establishing and maintaining a network communication connection with one or more networked devices.

Memory 302 of computing platform 300 stores vulnerability assessment plan generation module 310 that is executed by the processing device(s) and configured to generate a business process-specific vulnerability assessment plan for a selected business process, in accordance with embodiments of the present invention. The module 310 is configured to receive or otherwise extract first data 312 from various disparate data sources/systems of record. Further, since the data is being received from disparate data source having different formatting, some of which may be unstructured data, module 310 is configured to automatically compile the data into a standardized structured format and, where necessary, automatically consolidate the data.

The module 310 is further configured to automatically identify, from the first data 312, critical vulnerability assets 316 associated with the selected computer-related process 314. The critical vulnerability assets 316 are those assets that provide an overall understanding of the computer-related process and that may indicate areas of focus for the vulnerability assessment (i.e., inherent vulnerabilities). Such, critical vulnerability assets 316 may include, but are not limited to, applications/software associated with the computer-related process, the type of data used, stored or accessible to the applications, hardware associated with the computer-related process, entities associated with the computer-related process, work flows associated with the computer-related process, recent security and/or audit issues associated with the computer-related process and the like. In this regard, the identified critical vulnerability assets 316 are automatically mapped to the selected computer-related process.

The module 310 is further configured to implement one or more machine learning algorithms/models 318, along with a process-specific control framework 310 to evaluate the computer-related process 314 and identify a plurality of critical controls 322 for the assessment based, at least, on the results of previous assessments and the identified critical vulnerability assets 316. In this regard, while the computer-related process will comprise a multitude of different controls, the machine learning algorithms/models 318 serve to identify which of those controls 322 need to be the focus (i.e., are "critical") of the impending vulnerability assessment.

The module 310 is further configured to generate a vulnerability assessment plan 324 specific to the computer-related process 314 and including the identified controls 322. The assessment plan 322 will include the detailed test steps, inquires and other actions that are required to be performed in order to make a valid assessment.

The memory 302 of computing platform 300 additionally includes vulnerability assessment module 330 that is executable by the processing device(s) 304 and configured to implement automated/computerized aspects of vulnerability assessment plan 324, in accordance with embodiments of the present invention. Specifically, vulnerability assessment module 330 is configured to implement one or more threat modeling algorithms 332 to define vulnerabilities 334 associated with the selected computer-related process 314. The vulnerabilities include both technology-related and non-technology-related vulnerabilities associated with the computer-related process.

Additionally, the memory 302 of computing platform 300 includes network remediation module 340 that is executable by the processing device(s) 304 and is configured to determine one or more network tasks 342 for optimizing the distributed computing network 200 as a result of one or more of the technology-related vulnerabilities 334-A, in accordance with embodiments of the present invention. The remediation module 340 is further configured to automatically, in response to determining the network task(s), execute 344 one or more of the network tasks 342 to optimize (e.g., lessen or eliminate the vulnerability) the distributed computing network 200.

Referring to FIG. 2, a block diagram is a depicted of the computing platform 300 shown and discussed in relation to FIG. 1 and provides further functionality of the system 100, in accordance with alternate embodiments of the present invention. The memory 302 of computing platform 300 stores taxonomy module 350 that is executable by the processing device 304 and is configured to map/classify business processes to an established taxonomy, in accordance with embodiments of the present invention. The taxonomy for a given computer-related process is subsequently relied upon by the system in determining the vulnerability assessment plan (i.e., determining (i) which controls associated with the most granular level of a computer-related process are critical and (ii) the vulnerabilities associated with the most granular level of the computer-related process). As a precursor to the establishment of a process taxonomy, a plurality of critical computer-related functions 352 are identified. Computer-related functions are high-level computer-related activities within an enterprise or the like that are systemically important and require IT/cyber security. In specific embodiments of the invention, the critical computer-related functions 352 may be identified by industry guidance.

The module 350 is configured to receive second data 354 from a plurality of disparate data sources. Similar to first data 312, since the second data 354 is being received from disparate data source having different formatting, some of which may be unstructured data, module 350 is configured to automatically compile the data into a standardized structured format and, where necessary, automatically consolidate the data.

The module 310 is further configured to automatically identify, from the first data 354, critical computer-related services 356, computer related processes 358, sub-processes 360, technology components 362, process workflows 364 and entities/individuals 366. Critical computer-related services are services provided by the enterprise or the like that include high vulnerability processes. Once identified, the module 310 is configured to automatically map/classify the computer-related critical functions 352 to the computer-related critical services 356, which is considered the first tier 372 of the mapping 370. The module 310 is further configured to automatically map/classify the critical computer-related services 356 to the computer-related processes 358, which is considered the second tier 374 of the mapping 370. Further, the module 370 is configured to automatically map/classify the computer-related processes 358 to sub-processes 360, technology components 362, process workflows 364 and entities/individual 366 associated with the computer-related process.

Referring to FIG. 3 a block diagram is a depicted of the computing platform 300 shown and discussed in relation to FIG. 1 highlighting further functionality of the vulnerability assessment plan generation module 310, in accordance with embodiments of the present invention. As previously discussed, module 310 is configured to receive, gather, extract or the like first data 312 from various disparate data sources/systems of record. As require, module 310 is further configured, where necessary, to automatically (i) compile the data into a standardized structured format and (ii) consolidate the data. Additionally, module 310 is configured to automatically identify, from the first data 312, critical vulnerability assets 316 associated with the selected computer-related process 314. The critical vulnerability assets 316 are those assets that provide an overall understanding of the computer-related process and indicate areas of focus for the vulnerability assessment (i.e., inherent vulnerabilities). Such, critical vulnerability assets 316 may include, but are not limited to, applications/software associated with the computer-related process, the type of data used, stored or accessible to the applications, hardware associated with the computer-related process, entities associated with the computer-related process, work flows associated with the computer-related process, recent security and/or audit issues associated with the computer-related process and the like.

The module 310 is further configured to implement one or more machine learning algorithms/models 318, along with a process-specific control framework 310 to evaluate the computer-related process 314 and identify a plurality of critical controls 322 for the assessment based, at least, on the results of previous assessments and the identified critical vulnerability assets 316. In specific embodiments of the invention, module 312 is configured to implement classification supervised learning, such as one or more supervised logistic regression algorithms 380 to assign/map the critical vulnerability assets to the selected computer-related process 314-A. In further specific embodiments of the invention, module 312 is configured to implement classification supervised learning, such as one or more random decision forest algorithms to identify/select the plurality of controls 322 applicable to the selected computer-related process 314-A. Additionally, module 310 is further configured to generate a vulnerability assessment plan 324 specific to the computer-related process 314-A and including the identified controls 322. The assessment plan 322 will include the detailed test steps, inquires and other actions that are required to be performed in order to make a valid assessment.

Referring to FIG. 4, a block diagram is a depicted of the computing platform 300 shown and discussed in relation to FIG. 1 highlighting further functionality of the vulnerability assessment module 330, in accordance with embodiments of the present invention. The vulnerability assessment module. Vulnerability assessment module 350 is configured to implement one or more machine learning algorithms 390 to map the plurality of critical controls 322 to one or more one or more attack patterns/trees 392, such as Common Attack Pattern Enumeration and Classification (CAPEC) attack patterns or the like. Once the attack patterns 392 have been generated, the attack patterns 392 are applied to the critical vulnerability assets 316 to define the vulnerabilities 334.

Further, in specific embodiments of the invention, vulnerability assessment module 350 is configured to implement one or more machine learning algorithms 394 to determine a quantification 396 for the vulnerabilities 334. For example, in specific embodiments of the invention, Naïve-Bayes theorem or the like is used to determine the quantification 396 of the vulnerabilities. The quantification may take into account the threat event frequency, probability of action, threat capability, resistance and the like. In further embodiments of the invention, one or more machine learning algorithms, such as classification supervised learning algorithm(s) may be implemented to predict loss event frequency and the magnitude of such loss events. In other embodiments of the invention, a Mont Carlo Simulation Engine may be implemented to determine the most likely expected loss/exposure from an identified vulnerability.

Referring to FIG. 5, a block diagram is a depicted of the computing platform 300 shown and discussed in relation to FIG. 1 highlighting further functionality of the network remediation module 340, in accordance with embodiments of the present invention. As previously discussed, the network remediation module 340 is configured to determine one or more network tasks 342 for optimizing the distributed computing network 200 as a result of one or more of the technology-related vulnerabilities 334-A. The remediation module 340 is further configured to automatically, in response to determining the network task(s), execute 344 one or more of the network tasks 342 to optimize (e.g., lessen or eliminate the vulnerability) the distributed computing network 200. The network tasks may include, but are not limited to, re-routing network traffic 342-A from one or more network servers to one or more other network servers, opening and/or closing network ports 342-B, changing a communication protocol 342-C (e.g., changing to a more secure communication protocol or the like), and/or any other network task that would serve to optimize the network in view of threat presented by the one or more vulnerabilities.

In additional embodiments of the invention, network remediation module 340 additionally includes monitoring sub-module that is configured to monitor 402 the execution 344 of one or more network tasks 342. In similar additional embodiments of the invention, the network remediation module 340 includes a reporting sub-module 404 that is configured to generate and communicate one or more remediation reports 406 that indicate the results of the monitoring, i.e., the status/progress 408 of the execution 344 of the network tasks 342 or the like.

Referring to FIG. 6, a block diagram is a depicted of the computing platform 300 shown and discussed in relation to FIG. 1 highlighting further modules in the IT/cyber security assessment model for computer-related processes, in accordance with embodiments of the present invention. In specific embodiments of the invention memory 302 of computing platform 300 stores function criticality determining module 410, which is executable by the processing device(s) 304 and configured to implement one or more machine learning algorithms 412 that use taxonomy-defined logic 412 to determine a level of criticality 416 for subsequent/future computer-related functions 352. In this regard, the criticality of subsequent/future computer-related functions may be determined based on previous taxonomies as opposed to or in addition to using industry guidance.

In other specific embodiments of the invention, memory 302 of computing platform 300 additionally stores vulnerability assessment scheduling module 420, which is executable by the processing device(s) 304 and configured to implement one or more machine learning algorithms 422 to determine a prioritization 424 for the computer-related processes 358 according to the taxonomy mapping 370 (i.e., the vulnerability quantifications built into the various tiers of the taxonomy). Prioritization 424 forms the basis for the module 420 to determine areas of focus and assessment schedules 426.

In still further specific embodiments of the invention, memory 302 of computing platform 300 stores vulnerability reporting module 430, which is executable by the processing device(s) and configured to dynamically generate and initiate electronic communication of one or more vulnerability assessment reports 432 that are configured to map 434 the determined vulnerabilities 314 to other similar industry benchmarks 436. In addition the vulnerability assessment reports 432 may include assessment observations and the estimated impact of the vulnerabilities (as determined from the from vulnerability quantification 396).

Referring to FIG. 7, a flow diagram is depicted of a method 500 for Information Technology (IT)/cyber security assessment for a computer-related process and associated automated remediation, in accordance with embodiments of the present disclosure. Initially, at optional Events 510-530 a taxonomy is developed to map computer-related processes to a most granular level of process-related vulnerability assets. At Event 510, a plurality of computer-related critical functions are identified. The critical functions may be initially identified by industry guidance and subsequently identified by implementing machine learning algorithms using taxonomy-defined logic that determines a level of criticality for computer-related functions. At Event 520, in response to receiving data from a plurality of disparate data sources and, in some embodiments, automatically formatting and consolidating the data, a plurality of computer-related services, computer-related processes and critical vulnerability assets are identified. Once identified, at Event 530, (i) the identified computer-related critical functions are automatically mapped to the identified computer-related services, (ii) the identified computer-related critical services are automatically mapped to the computer-related processes, and (iii) the computer-related process and mapped to (a) sub-processes, (b) entities/individuals responsible for the process, (c) work flows for performing the process, and (d) technology components used in the process.

At Event 540, machine learning algorithms are implemented along with a process-specific control framework to identify a plurality of critical controls for a selected one of the computer-related processes based at least on previous assessments and the identified critical vulnerability assets. As previous discussed, while a computer-related process may have a myriad of different controls the identification step herein described serves to determine which of the controls are most critical as to the vulnerability posed and serve to identify areas of focus for the vulnerability assessment. In specific embodiments of the invention, one or more logistic regression algorithms are implemented to assign the critical vulnerability assets to the selected computer-related process and one or more supervised decision forest algorithms are implemented to identify the plurality of critical controls for the selected computer-related process.

At Event 550, a vulnerability assessment plan specific to the computer-related process including the identified critical controls is automatically generated. The vulnerability assessment plan includes the detailed steps that are required of the assessment, inquiries that are required to be performed and the like in light of the critical controls.

At Event 560, one or more threat modeling algorithms are implemented to define vulnerabilities. In specific embodiments of the invention machine learning algorithms may be implemented to map the plurality of critical controls to threat modeling algorithms, such as attack patterns and the attack patterns are applied to one or more of the critical vulnerability assets to define vulnerabilities associated with sub-processes, entities/individuals, workflows and/or technology components. In additional embodiments of the invention, machine learning algorithms are implemented to quantify one or more of the unmitigated vulnerabilities associated with the computer-related process.

At Event 570, one or more networks tasks are determined for optimizing a distributed communication network based on the unmitigated vulnerabilities and, at Event 580, one or more of the network tasks are automatically executed to optimize the network. The network tasks may include, but are not limited to, re-routing network traffic, opening and/or closing communication ports, changing communication protocols or the like.

Thus, present embodiments of the invention provides for information technology/cyber security assessments of computer-related processes to identify where vulnerabilities exist within the process and, in some embodiments, the impact of the vulnerabilities. As a result of identifying the vulnerabilities, technology-related vulnerabilities are network-based remediation tasks are identified and automatically executed. In specific embodiments of the invention, the most granular level of process related data is identified through a taxonomy that is automatically generated for critical functions and their underlying critical processes. The taxonomy serves as the basis for building the inventory of process-related data that is assessed/evaluated for security vulnerabilities.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for defining security vulnerabilities of computer-related processes and implementing automated remediation, the system comprising:
   a distributed computing network comprising a plurality of computing apparatus that are configured to communicate via the distributed computing network;
   a computing platform disposed in one or more of the computing apparatus and comprising a memory and one or more processing devices in communication with the memory;
   a vulnerability assessment plan generation module stored in the memory, executable by one or more of the processing devices and configured to:
      receive first data from a plurality of disparate data sources;
      identify, from the first data, critical vulnerability assets associated with a selected one of a plurality of computer-related processes;
      implement one or more machine learning algorithms and a process-related control framework to identify a plurality of controls for a selected one of the computer-related processes based at least on the critical vulnerability assets; and
      generate a vulnerability assessment specific to the selected computer-related process including the plurality of controls;
   a vulnerability assessment module stored in the memory, executable by one or more of the processing devices and configured to:
      implement one or more threat modeling algorithms to define vulnerabilities for the selected one of the computer-related processes;
   a network remediation module stored in the memory executable by one or more of the processing devices and configured to:
      determine one or more network tasks for optimizing the distributed computing network-based on the defined vulnerabilities; and
      in response to determining the one or more network tasks, execute at least one of the tasks to optimize the distributed computing network; and
   a taxonomy module stored in the memory, executable by the one or more processing devices and configured to:
      identify a plurality of computer-related critical functions;
      receive second data from a plurality of second disparate data sources,
      identify, from the second data, a plurality of computer-related critical services and a plurality computer-related processes; and
      map (i) the identified computer-related critical functions to the computer-related critical services, (ii) the computer-related critical services to the computer-related processes and (iii) the computer-related processes to at least one of (a) one or more sub-processes associated with a computer-related process, (b) one or more entities responsible for a computer-related process, (c) one or more process flows for conducting a computer-related process, and (d) technology components required for a computer-related process.

2. The system of claim 1, wherein the vulnerability assessment module is further configured to:
   implement one or more machine learning algorithms to map one or more of the plurality of controls to a plurality attack patterns.

3. The system of claim 2, wherein the vulnerability assessment module is further configured to:
   apply the plurality of attack patterns to one or more of the critical vulnerability assets to define vulnerabilities associated (a) at least one of the one or more sub-processes associated with a computer-related process, (b) at least one of the one or more entities responsible for a computer-related process, (c) at least one of the one or more process flows for conducting a computer-related process, and (d) at least one of the technology components required for a computer-related process.

4. The system of claim 2, wherein the vulnerability assessment module is further configured to:
   implement one or more machine learning algorithms to quantify one of more the defined and unmitigated vulnerabilities associated with the computer-related process.

5. The system of claim 1, wherein the network remediation module is further configured to:
   determine the one or more network tasks, wherein the network tasks include at least one of (i) re-routing network traffic from one or more first computing apparatus to one or more computing apparatus, (ii) opening and closing ports in one or more of the computing apparatus, and (iii) changing communication protocols for one or more network communications delivered via the distributed communication network.

6. The system of claim 1, wherein the network remediation module is further configured to:
   monitor the execution of the one or more network tasks; and
   generate and communicate one or more remediation reports that indicate a progress of the monitored one or more network tasks.

7. The system of claim 1, further comprising a computer-related function criticality-determining module stored in the memory, executable by one or more of the processing devices and configured to:
   implement one or more machine learning algorithms using logic defined by processing of the taxonomy module to determine a level of criticality associated with computer-related functions.

8. The system of claim 1, further comprising a vulnerability assessment scheduling module stored in the memory, executable by one or more of the processing devices and configured to:

implement one or more machine learning algorithms to determine prioritization for the plurality of computer-related processes based at least on mapping results of the taxonomy module; and
schedule a plurality of vulnerability assessments for the computer-related processes based at least on the based on the prioritization.

9. The system of claim 1, wherein the vulnerability assessment plan generation module is further configured to:
implement one or more supervised logistic regression algorithms to assign the critical vulnerability assets to the selected computer-related process; and
implement one or more supervised decision forest algorithms to identify the plurality of controls for the selected one of the computer-related processes.

10. The system of claim 1, further comprising a vulnerability reporting module stored in the memory, executable by one or more of the processing devices and configured to:
map the defined vulnerabilities to industry benchmarks; and
generate and communicate a vulnerability assessment report that is based on the mapping of the defined vulnerabilities to the industry standards and indicates an estimated impact of the defined vulnerabilities.

11. A computer-implemented method for defining security vulnerabilities of computer-related processes and implementing automated remediation, the method executed by one or more computing device processors and comprising:
receiving first data from a plurality of disparate data sources;
identifying, from the first data, critical vulnerability assets associated with a selected one of a plurality of computer-related processes;
implementing one or more machine learning algorithms and a process-related control framework to identify a plurality of controls for a selected one of the computer-related processes based at least on the critical vulnerability assets;
generating a vulnerability assessment specific to the selected computer-related process including the plurality of controls;
implementing one or more threat modeling algorithms to define vulnerabilities for the selected one of the computer-related processes;
determining one or more network tasks for optimizing a distributed computing network based on the defined vulnerabilities;
in response to determining the one or more network tasks, executing at least one of the tasks to optimize the distributed computing network;
identifying a plurality of computer-related critical functions;
receiving second data from a plurality of second disparate data sources;
identifying, from the second data, a plurality of computer-related critical services and a plurality computer-related processes; and
mapping:
(i) the identified computer-related critical functions to the computer-related critical services,
(ii) the computer-related critical services to the computer-related processes and
(iii) the computer-related processes to at least one of (a) one or more sub-processes associated with a computer-related process, b one or more entities responsible for a computer-related process, (c) one or more process flows for conducting a computer-related process, and (d) technology components required for a computer-related process.

12. The computer-implemented method of claim 11, further comprising:
implementing one or more machine learning algorithms to map one or more of the plurality of controls to a plurality attack patterns; and
applying the plurality of attack patterns to one or more of the critical vulnerability assets to define vulnerabilities associated (a) at least one of the one or more sub-processes associated with a computer-related process, (b) at least one of the one or more entities responsible for a computer-related process, (c) at least one of the one or more process flows for conducting a computer-related process, and (d) at least one of the technology components required for a computer-related process.

13. The computer-implemented method of claim 11, wherein determining the one or more network tasks, further comprises determining the one or more network tasks including at least one of (i) re-routing network traffic from one or more first computing apparatus to one or more computing apparatus, (ii) opening and closing ports in one or more of the computing apparatus, and (iii) changing communication protocols for one or more network communications delivered via the distributed communication network.

14. The computer-implemented method of claim 13, further comprising:
monitoring the execution of the one or more network tasks; and
generating and communicating one or more remediation reports that indicate a progress of the monitored one or more network tasks.

15. A computer program product comprising:
a non-transitory computer-readable medium comprising:
a first set of codes for causing a computer to receive first data from a plurality of disparate data sources;
a second set of codes for causing a computer to identify, from the first data, critical vulnerability assets associated with a selected one of a plurality of computer-related processes;
a third set of codes for causing a computer to implement one or more machine learning algorithms and a process-related control framework to identify a plurality of controls for a selected one of the computer-related processes based at least on the critical vulnerability assets;
a fourth set of codes for causing a computer to generate a vulnerability assessment specific to the selected computer-related process including the plurality of controls;
a fifth set of codes for causing a computer to implement one or more threat modeling algorithms to define vulnerabilities for the selected one of the computer-related processes;
a sixth set of codes for causing a computer to determine one or more network tasks for optimizing a distributed computing network based on the defined vulnerabilities; and
a seventh set of codes for causing a computer to, in response to determining the one or more network tasks, executing at least one of the tasks to optimize the distributed computing network;
an eighth set codes for causing a computer to implement one or more machine learning algorithms to map one or more of the plurality of controls to a plurality attack patterns; and a ninth set of codes for causing a computer to apply the plurality of attack patterns to one or more of the critical vulnerability assets to define vulnerabilities associated (a) at least one of the one or more sub-processes associated with a computer-related process, (b) at least one of the one or more entities responsible for a computer-related process, (c) at least one of the one or more process flows for conducting a computer-related process, and (d) at least one of the technology components required for a computer-related process.

16. The computer-program product of claim 15, further comprising:

a tenth set of codes for causing a computer to identify a plurality of computer-related critical functions, receive second data from a plurality of second disparate data sources, and identify, the second data, a plurality of computer-related critical services and a plurality computer-related processes; and an eleventh set of codes for causing a computer to map (i) the identified computer-related critical functions to the computer-related critical services, (ii) the computer-related critical services to the computer-related processes and (iii) the computer-related processes to at least one of (a) one or more sub-processes associated with a computer-related process, (b) one or more entities responsible for a computer-related process, (c) one or more process flows for conducting a computer-related process, and (d) technology components required for a computer-related process.

* * * * *